(No Model.)

J. A. LEE & W. H. BARROWS.
VEHICLE HUB.

No. 436,246. Patented Sept. 9, 1890.

WITNESSES:
J. E. Criswell
C. Sedgwick

INVENTOR:
J. A. Lee
W. H. Barrows
BY Munn & Co.
ATTORNEYS

UNITED STATES PATENT OFFICE.

JOHN A. LEE AND WILLIAM H. BARROWS, OF BROOKLYN, NEW YORK.

VEHICLE-HUB.

SPECIFICATION forming part of Letters Patent No. 436,246, dated September 9, 1890.

Application filed July 9, 1890. Serial No. 358,164. (No model.)

*To all whom it may concern:*

Be it known that we, JOHN A. LEE and WILLIAM H. BARROWS, both of Brooklyn, in the county of Kings and State of New York, have invented a new and Improved Wheel-Hub, of which the following is a full, clear, and exact description.

Our invention relates to improvements in hubs for vehicle-wheels, and more especially to that class of vehicles having revolving axles from which power is taken to drive machinery.

The object of our invention is to produce a hub of simple construction, that is strong and durable, that is light running, that thoroughly excludes dust from the bearing-surface of the axle, and that is provided with means for oiling the axle without removing the hub.

To this end our invention consists in certain features of construction and combinations of parts, which will be hereinafter fully described, and specifically pointed out in the claims.

Reference is to be had to the accompanying drawings, forming a part of this specification, in which similar letters of reference indicate corresponding parts in both the figures.

Figure 1:
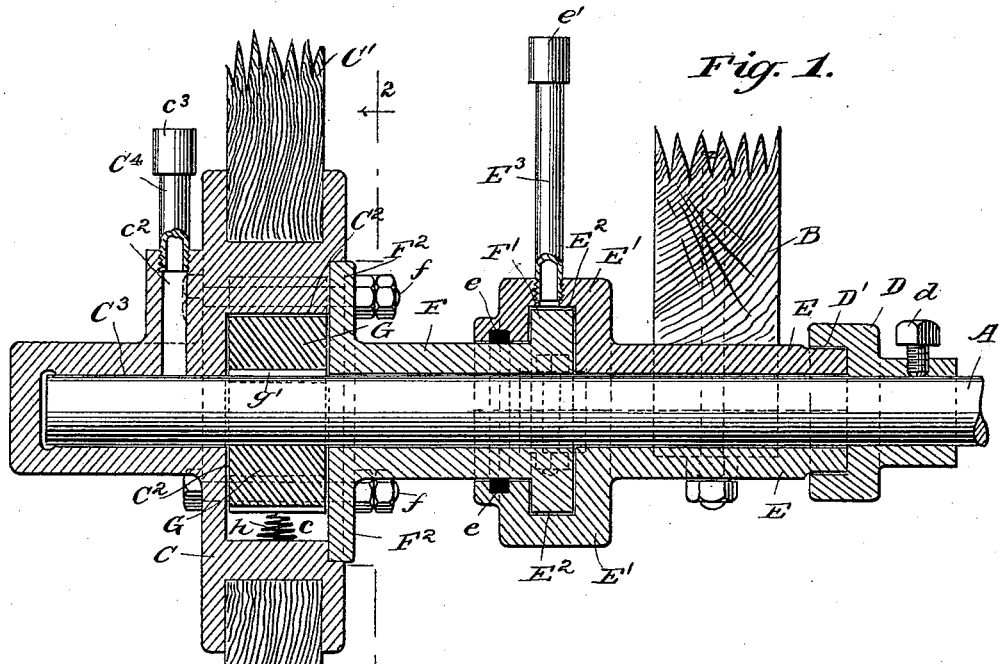
Figure 2:
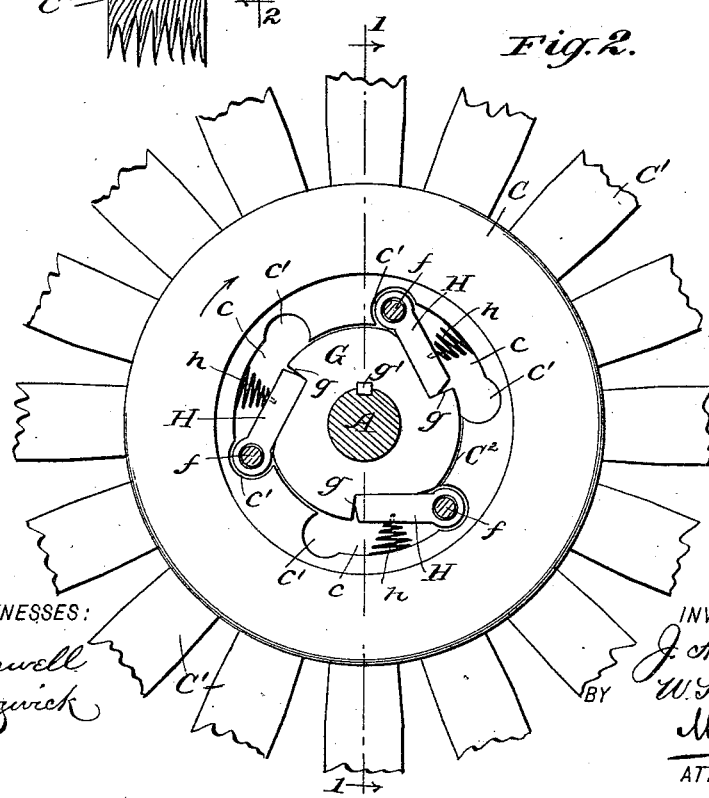

Figure 1 is a broken vertical longitudinal section of the hub embodying our invention as applied to an axle on the line 1 1 of Fig. 2, and Fig. 2 is a transverse section on the line 2 2 of Fig. 1.

The axle A is of the usual construction and supports a frame B, and has a hub C loosely mounted on the end thereof, and fixed to the axle by the bolt $d$, just inside that portion of the frame B which is supported by the axle, is a collar D, having in its outer side a recess D', adapted to receive the inner end of the sleeve E, thereby preventing any dirt from entering upon the bearing-surface of the axle from the inner end of the hub. The sleeve E is composed of two similar parts, as indicated by the dotted lines in Fig. 1, and is firmly bolted to the frame B. The sleeve is provided near its outer end with an enlarged annular portion E', having a recess $E^2$ therein adapted to fit the inner flange F' of the bushing F, and near the outer end of the sleeve is a suitable packing $e$, which fits within a groove in the inner surface of the sleeve and which prevents any dirt from entering between the sleeve and the bushing F. A tube $E^3$ is screwed into an opening through the upper portion of the enlargement E' of the sleeve E, said tube opening upon the flange F' of the bushing and having at its upper end a suitable cap $e'$. It will thus be seen that oil may be easily inserted through the tube upon the flange F', so as to prevent friction between the flange and the sleeve E, or between the sleeve and the axle. The bushing F fits nicely upon the axle A, and is provided with a flange at each end, the inner flange F' being inclosed by the sleeve E, as described above, and the outer flange $F^2$ being shouldered into the hub C, and bolted to the same by the bolts $f$, which extend through the flange $F^2$ and the hub C, and which also serve as pivots for the ratchet-pawls, as described below. The bushing F thus forms the inner end of the hub.

The hub C is provided with spokes C' which radiate therefrom in the usual manner, with a central annular recess $C^2$ adapted to inclose the ratchet-block G, and with an outer elongated bearing-surface $C^3$, which incloses the outer end of the axle. The ratchet-block G fits nicely within the recess $C^2$ of the hub C, but does not interfere with the free turning of the hub upon the axle. The ratchet-block is provided upon its outer edge with notches or serrations $g$ adapted to receive the ends of the pawls H, said notches having at one side an abrupt angular shoulder, and having the opposite side gradually inclined so that the hub may turn freely upon the axle in one direction, but when turned in the other the pawls will engage the notches and cause the axle to turn with the hub. The ratchet-block is fixed to the axle A by the key $g'$, although it may be fixed in any suitable manner, and it thus serves as a collar to hold the hub in position upon the axle.

Within the hub C and opposite the ratchet G are recesses $c$ adapted to receive the pawls H, said recesses having enlarged portions $c'$ at each end to receive the head of the pawl H. The pawls H are pivoted on the bolts $f$, and are provided with springs $h$ which press against the inner surface of the recesses $c$ and the outer sides of the pawls, and thus press the pawls against the ratchet-block G.

In practice the springs $h$ are not absolutely necessary, and they may be dispensed with, as two of the pawls H are sure to drop into engagement with two of the notches $g$ of the ratchet-block of their own gravity. To attach the pawls to a left-handed hub the bolts $f$ may be made to extend through the opposite ends $c'$ of the recesses $c$, and the pawls may be turned end for end. The hub C has a transverse opening $c^2$ extending from the axle to the outer surface of the hub, and screwed to the outer end of the opening is a tube $C^4$, having a suitable cap $e^3$, and oil may be inserted through the tube to lubricate the bearing-surface of the axle.

From the foregoing description it will readily be seen that the hub has a large bearing-surface, that it may be easily oiled, and that the bearing-surface of the axle is protected so that no dust or dirt can get between the axle and the hub. When the carriage is drawn forward, the hub will be turned so as to bring the pawls H into engagement with the notches $g$ of the ratchet-block G, thereby turning the ratchet-block and the axle and driving any machinery that may be connected with the axle, and when the carriage is backed the hub will turn freely over the ratchet-block so as not to turn the axle or work the machinery connected therewith.

It will be noticed that when oil is inserted through the tube $C^4$ it will lubricate the axle-bearing and will also fill the recess $C^2$, so that the ratchet will work in oil and there will consequently be but little wear.

Having thus fully described our invention, we claim as new and desire to secure by Letters Patent—

1. A wheel-hub having a transverse bore, enlarged ratchet-receiving recess $C^2$ and closed extension $C^3$, and pawls mounted in said recess $C^2$, to engage the ratchet, and the bushing F, having a flange $F^2$ bolted to the hub over the open end of the recess $C^2$.

2. The combination, with an axle having a ratchet-block fixed thereto, of a hub having a central recess to inclose the ratchet-block, smaller recesses opening from said central recess, said smaller recesses having enlarged portions at each end, and reversible pawls pivoted within the smaller recesses and adapted to engage the ratchet-block, substantially as described.

3. The combination, with an axle having a ratchet-block fixed thereto, of a hub having a central recess to inclose the ratchet-block, pawls pivoted around the recess so as to engage the ratchet-block, and a bushing resting upon the axle and bolted to the hub, the connecting-bolts forming pivots for the pawls, substantially as described.

4. The combination, with an axle having a ratchet-block fixed thereto, of a hub having a central recess to inclose the ratchet-block, pawls pivoted around the recess to engage the ratchet-block, a bushing mounted upon the axle, said bushing having flanges at each end, one of which is bolted to the hub, and a sleeve adapted for attachment to a vehicle-frame, said sleeve having its outer end enlarged and recessed to fit the inner flange of the bushing, substantially as described.

5. The combination, with an axle having a ratchet fixed thereto, of a hub having a central recess to inclose the ratchet-block and having pawls pivoted around the recess to engage the ratchet, a flanged bushing mounted upon the axle and having one of the flanges bolted to the hub, a sleeve adapted for attachment to a frame, said sleeve having its outer end enlarged and recessed to fit the inner flange of the bushing, a suitable packing between the sleeve and the bushing, and an oil-tube opening through the sleeve and delivering upon the bushing, substantially as described.

6. A vehicle-hub comprising a ratchet-block adapted to be fixed to an axle, a body portion having a central recess adapted to inclose the ratchet-block and a closed outer bearing, pawls pivoted around the central recess to engage the ratchet-block, an oilway opening through the body portion upon the axle, a flanged bushing adapted to rest upon the axle and having one of its flanges bolted to the body of the hub, a sleeve adapted for attachment to a frame, said sleeve having its outer end enlarged and recessed to fit a flange of the bushing having a suitable packing between it and the bushing, an oilway opening through its enlarged portion, and a collar adapted to be attached to the axle, said collar having a recess to fit the inner end of the sleeve, all substantially as described.

JOHN A. LEE.
WILLIAM H. BARROWS.

Witnesses:
WARREN B. HUTCHINSON,
EDGAR TATE.